US006756118B2

(12) United States Patent
Aichele et al.

(10) Patent No.: US 6,756,118 B2

(45) Date of Patent: Jun. 29, 2004

(54) POWDERED METAL COMPOSITE MATERIAL AND STARTING MATERIAL AND METHOD FOR PRODUCING SUCH A COMPOSITE MATERIAL

(75) Inventors: Wilfried Aichele, Winnenden (DE); Hans-Peter Koch, Stuttgart (DE); Andreas Harzer, Schwieberdingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/086,760

(22) Filed: Feb. 28, 2002

(65) Prior Publication Data

US 2002/0122942 A1 Sep. 5, 2002

(30) Foreign Application Priority Data

Mar. 3, 2001 (DE) ........................................ 101 10 341

(51) Int. Cl.[7] .................................................. B32B 5/16

(52) U.S. Cl. ...................... 428/403; 428/404; 427/212; 427/215; 427/216; 427/219

(58) Field of Search ................................ 428/403, 404; 427/212, 215, 216, 219

(56) References Cited

U.S. PATENT DOCUMENTS 5,871,840 A * 2/1999 Asada et al. ................ 428/328
6,007,743 A * 12/1999 Asada et al. ................ 252/513
6,060,165 A * 5/2000 Asada et al. ................ 428/403

FOREIGN PATENT DOCUMENTS

EP 0 673 284 9/1995
EP 0673284 B1 * 1/2000

* cited by examiner

*Primary Examiner*—Ieszek B Kiliman
(74) *Attorney, Agent, or Firm*—Kenyon & Kenyon

(57) ABSTRACT

In order to state a powdered metal composite material having a high specific electrical resistance and having good mechanical strength, very good resistance to temperature and to fuel, and a starting material and a method for the economical production of such a composite material, a powdered metal composite material having a high specific electrical resistance, which contains at least two oxides encapsulating the powdered metal particles, the oxides forming at least one common phase, and a starting material containing a powdered metal, which contains at least two antitack agents having oxidic pyrolysis residue and oxidic fine powder, and a method for producing such a composite material are made available, which relate to a starting material of the kind named, in which the starting material is pressed to form molded articles, in which the antitack agents are pyrolyzed in a nonreducing atmosphere to form oxides, and the oxides then present are made to react with one another to form at least one common phase.

30 Claims, No Drawings

POWDERED METAL COMPOSITE MATERIAL AND STARTING MATERIAL AND METHOD FOR PRODUCING SUCH A COMPOSITE MATERIAL

FIELD OF THE INVENTION

The present method relates to a powdered metal composite material having a high specific electrical resistance, and to a starting material and a method for producing such a composite material.

BACKGROUND INFORMATION

Powdered metal composite materials having high specific electrical resistance can be applied technically, for instance, as high-ohmic steels and as magnetically soft components in high-speed magnetic valves. Special powdered metal/plastic composites have been developed for the latter application. They are made by using the techniques of powdered metallurgy, by compression molding of powdered metal particles coated with electrically insulating plastic. The pressure-molded powdered metal particles are bonded to one another by the plastic. These powdered metal/plastic composites have a very high electrical resistance compared to pure iron. But the situation is that, as opposed the classical sintering materials, they show a reduction in strength, permeability, magnetic saturation and temperature and fuel resistance.

In powdered metallurgy (PM), the metal powders are laced with small proportions of antitack or lubricating agents. This addition has the effect of making the molded article denser, since it promotes gliding on one another of the powdered metal particles during the compression, reduces the releasing forces and increases the service life of the press tool by lubricating the press die and female die.

The antitack or lubricating agents are usually added to the powdered metals in quantities between 0.1 and 1.5% by weight. Apart from just mixing finely pulverized antitack agents with powdered metals, it is also possible to coat the powdered metal particles with antitack agents. This can be done by using a solution of the antitack agents in a suitable solvent, as described, for example, in European Published Patent Application No. 0 673 284, or by wetting the metal particles with the fused mass of the antitack agent. Molding by axial pressing is usually followed by heat treatment. During that process, the added processing materials undergo pyrolysis at temperatures between 150 and 500° C., which is far below the sintering temperature of the powdered metal (sintering temperature of iron 1120° C. to 1280° C.).

Whereas antitack agents, organic based, such as waxes and fatty acids, pyrolyze largely free of any residue under a protective gas, metal soaps, for example, leave metal oxides in the powder union. These, such as ZnO, weaken the structure to the extent that they cannot be reduced to their metals in a reducing atmosphere in the subsequent sintering process, as can, for example the oxides of iron, cobalt, nickel, copper, molybdenum or manganese. Thus, European Published Patent Application No. 0 673 284 describes how, by combination of different metal soaps as antitack agent, by the reduction of the oxides generated by the pyrolysis in a hydrogen atmosphere and by sintering, targeted metallic alloys among one another or with the molded powdered metals are created.

Soft magnetic composite materials for magnetic valves can also be manufactured in this manner. However, in order to achieve good switching dynamics, the sintered, axially molded soft magnetic powdered metals would have to have a substantially higher electrical resistance (by a factor of 100, or so).

SUMMARY OF THE INVENTION

It is the object of the present invention to state a powdered metal composite material having a high specific electrical resistance along with good mechanical strength, a very good temperature and fuel resistance and a starting material and a method for the efficient production of such a composite material.

This object is attained by a powdered metal composite material a starting material and a method for producing the composite material, all of which are according to the present invention.

Whereas oxides, in composite materials consisting mainly of powdered metal, have a partially negative influence on the properties, such as the mechanical and possibly the magnetic properties, the inventors have determined that several oxides, which form at least one common phase, can impart to the composite materials a very good mechanical, thermal and chemical stability.

According to the present invention, the starting material for manufacturing a powdered metal composite material having a high specific electrical resistance can be made up without a problem in such a way that the composite material made of it has a satisfactory compressed density in addition to the high resistance. To the extent that the amount of antitack agent, required for high resistance in the composite material, is too great for simultaneously obtaining optimal compressed density, in such cases, oxidic fine powder can be added to the at least one antitack agent, which can form at least one common phase with the pyrolysis product created from the at least one antitack agent, during further processing. In this connection, one must not accept any deterioration of the composite material properties.

The method according to the present invention is therefore especially advantageous, because the oxides created by the pyrolysis of the antitack agents used in powdered metallurgy can be used to produce the common phase.

In an advantageous manner, according to the present invention, the high-ohmic composite materials, in their embodiment as soft magnetic composite materials, can also be used particularly for magnetic valves having good switching dynamics, on account of their high magnetic saturation and their high permeability. In this connection, it is especially favorable if the powdered metal is made substantially of iron materials, such as iron, iron-silicon, iron-cobalt and iron-nickel or mixtures of the materials named, iron being especially preferred. The phrase "is made substantially of" means, in this connection, that further materials can be present only in such quantities that the soft magnetic properties do not deteriorate noticeably.

It is advantageous if, as the at least one common phase, a glass is used, such as a silicate or boron-containing glass, or a specific compound selected from the group of mixed oxides having a spinel structure, of metal phosphates and of metal silicates.

It is favorable if, as antitack agent, at least one metal soap and/or at least one material from the group of mono, di or triesters of phosphoric acid, boric acid and silicic acid with long-chain alcohols and/or polydimethyldisiloxane is(are) contained in the starting material.

In the starting material according to the present invention, in the case of the combination of an antitack agent with oxidic fine powder, preferably at least one metal oxide and/or silicic acid is(are) used.

In order to ensure a high reactivity of the fine powder with the pyrolysis residues of the antitack agents, it is particularly advantageous if the particle diameter (initial grain size) of the fine powder is ≦ approximately 100 nm.

A satisfactory compressed density of the molded article, combined with a sufficiently high electrical resistance of the powdered metal composite material, is achieved in advantageous fashion if the proportion of the antitack agents in relation to the weight of the powdered metal 2.0 lies between approximately 0.1 and approximately 1.5% by weight, or the sum of the proportions of antitack agent and fine powder lies between approximately 0.2 and approximately 3% by weight.

It is advantageous if the relationship of the added amounts of antitack agents, or antitack agents and fine powder, as the case may be, is approximately stoichiometric with respect to the at least one specific compound to be formed in response to the reaction of the oxides, possibly in consideration of the quantities of the metal from the surface of the powdered metal entering into the reaction.

It is of advantage if, during pyrolysis and reaction, heating is carried on to a temperature distinctly below sintering temperature of the powdered metal, and it is particularly preferred, as long as the metal is iron, if heating is performed to a temperature between approximately 150° and approximately 550° C. At temperatures above approximately 550° C. current paths between the metal particles could arise, and at temperatures below approximately 150° C. the pyrolysis is incomplete and takes too long for an industrial method.

It is advantageous to perform the heating in a nonreducing atmosphere, and it is especially advantageous if, while doing so, the atmosphere is adjusted to the pyrolysis process.

DETAILED DESCRIPTION

In the following, the present invention is described in detail, in the light of soft magnetic composite materials and of starting materials and of methods for producing them. However, it should be made clear that, though the present invention can be explained in an especially clear fashion, using these examples, the present invention is not limited to these examples, and manifold deviations from them are possible within the framework of the claims.

The soft magnetic composite materials having a high specific electrical resistance are made of molded powdered metal particles which are furnished with a coating made chiefly of specific chemical compounds, which adhere well to the bare or surface-modified (such as phosphated) metal particles, and, depending on the particular application, additionally impart a high electrical resistance and resistance to temperature and fuel, and/or protect the metal from corrosion. The coating prevents electrical connection between the metal particles. The specific chemical compounds are made from mixed oxides having a spinel structure, such as mixed oxides from the group $Al_2MgO_4$ (spinel), $Al_2ZnO_4$ (zinc spinel), $Al_2MnO_4$ (manganese spinel), $Al_2FeO_4$ (iron spinel), $Fe_2MgO_4$ (magnoferrite), $Fe_3O_4$ (magnetite), $Fe_2ZnO_4$ (franklinite), $Fe_2MnO_4$ (jakobsite), $Fe_2NiO_4$ (trevirite), $Cr_2FeO_4$ (chromite) and $Cr_2MgO_4$ (magnochromite), metal phosphates, such as zinc and iron phosphate, silicate glasses, boron-containing glasses and metal silicates, such as $CoSiO_3$.

Thus, the soft magnetic composite materials according to the present invention contain no thermoplastics or thermosetting plastics as insulating agent or binding agent, such as do the metal-plastic composites. Nevertheless, compared to those, they also have a high specific electrical resistance, comparable or better mechanical strength, better resistance to temperature and fuel, comparable magnetic saturation and comparable permeability.

The soft magnetic composite materials according to the present invention are therefore suitable for use in fast-acting magnetic valves, particularly of the kind used in motor vehicle technology.

For the production of soft magnetic composite materials according to the present invention, powdered metals are mixed with combinations of new or known antitack agents or lubricating agents or are coated with these combinations (see above). As was explained before, the antitack agents of the present invention are used also for the purpose of producing a composite material having high electrical resistance. It so happens, however, that too high a proportion of antitack agent again reduces the compressed density of the molded article. With regard to the compressed density, the optimal proportion of antitack agent with respect to the powdered metal mass is < approximately 1% by weight. Antitack agent proportions of > approximately 2% by weight are therefore not usable, in general. In those cases in which the optimal antitack agent proportion is not sufficient for generating the desired high electrical resistance, it is therefore more favorable to disperse, in the antitack agents, oxidic fine powders (initial grain size preferably < approximately 100 nm), which react with the pyrolysis residues (see below) of the antitack agents, instead of raising the antitack agent proportion substantially above the optimum with respect to the compressed density. The proportion of the antitack agents, or the antitack agents and the fine powder, depends on the desired composition of the common phase targeted by the reaction of the pyrolysis products and possibly the fine powders. If we are dealing here with mixed oxides having spinel structures, with metal phosphates or with metal silicates, the antitack agents or the antitack agent/fine powder combinations should have such a composition that a stoichiometric conversion into the named compounds takes place. It should be considered, in this regard, that a part of the contents of the specific compounds can also derive from the surface of the powdered metals. In the individual case, the correct composition of the antitack agent combination or the antitack agent/fine powder combination has to be determined by simple experiments. If, instead of specific compounds, the reaction produces a common phase in the form of glasses, greater tolerances can be allowed in the composition of the antitack agent combinations or the antitack agent/pine powder combinations.

Examples of the named antitack agents are metal soaps, such as the stearates of calcium, magnesium, aluminum, zinc, cobalt, iron, nickel, copper, molybdenum and manganese, or esters of the higher alcohols with phosphoric, boric or silicic acids Examples of the named fine powders are oxides, such as $Fe_2O_3$ and silicic acid.

The mixture of powdered metal, antitack agent and possibly fine powder is axially pressed to form molded articles. Subsequently, the molded articles are heated in a nonreducing atmosphere, such as a nitrogen or argon atmosphere, to a temperature which is distinctly below the sintering temperature of the powdered metal, i.e. preferably below approximately 800° C., and especially preferred, between approximately 150° and approximately 550° C., so as to let the antitack agents pyrolyze. Below approximately 150° C., pyrolysis is at best incomplete, and the reactions run very slowly. At temperatures below 550° C. it is impossible for the metal particles to sinter together and thereby to form electrical current paths. At the temperatures used, the pyrolysis residues either react with one another and/or with the added fine powders and possibly with the surface of the metal particles to form the named, specific chemical compounds.

The present invention will now be discussed in even greater detail with reference to six special exemplary embodiments.

EXAMPLE 1

A mixture of iron powder and zinc stearate and a mono, di or triester of phosphoric acid and long-chain alcohols, such as a mixture of phosphoric acid monostearyl ester and phosphoric acid distearyl ester having a melting point of 70° C., as antitack agent was pressed to form a molded article, the proportion of the antitack agents with respect to the weight of the iron powder being approximately 1.7% by weight, and the atomic ratio Zn:P being approximately 3:2. The molded article was heated in a nonreducing atmosphere, such as in nitrogen, to a maximum temperature of approximately 550° C., the antitack agents pyrolyzing to ZnO and $P_2O_5$, and the oxides reacting with each other to form zinc phosphate. As was determined, zinc phosphate has a high specific electrical resistance, adheres well to metals and protects especially iron from corrosion. The composite material obtained is suitable as a soft magnetic material for fast-acting electric valves.

EXAMPLE 2

A mixture of iron powder and cobalt stearate and polydimethylsiloxane having reactive groups modified as antitack agent was pressed to form a molded article, the proportion of the antitack agent with respect to the weight of the iron powder amounting to approximately 1.6% by weight, and the atomic ratio Co:Si being approximately 1. The molded article was treated further, as described in Example 1. The pyrolysis products created from the antitack agents, CoO and $SiO_2$ then react to form $CoSiO_3$. The cobalt silicate showed good adhesion to iron powder, insulated well electrically and protected iron from corrosion.

EXAMPLE 3

A mixture of iron powder and cobalt stearate as antitack agent, to which a stoichiometric amount of pyrogenic silicic acid (initial grain size < approximately 100 nm) had been added, was pressed to form a molded article, the proportion of the antitack agent with respect to the weight of the iron powder being approximately 1.3% by weight. The molded article was treated further, as described in Example 1. Pyrolysis product CoO created from the antitack agent, here reacted with the $SiO_2$ of the silicic acid to form $CoSiO_3$.

EXAMPLE 4

A mixture of iron powder and zinc stearate as antitack agent was pressed to form a molded article, the proportion of the antitack agent with respect to the weight of the iron powder amounting to approximately 1.4% by weight, and the atomic ratio Zn:Fe being approximately 1:2. The molded article was treated further, as described in Example 1. The pyrolysis products ZnO and $Fe_2O_3$ here reacted with each other to form the spinel $Fe_2ZnO_4$ (franklinite). As was determined, spinels have good adhesion to iron powder, insulate well electrically, and protect iron in excellent fashion against corrosion.

EXAMPLE 5

A mixture of iron powder and zinc stearate as antitack agent, to which a stoichiometric amount of fine $Fe_2O_3$ had been added, which can be obtained, for example, from BASF AG as pigment having a grain size of 100 nm, was pressed to form a molded article, the proportion of the antitack agent with respect to the weight of the iron powder was approximately 1% by weight. The molded article was treated further, as described in Example 1. Pyrolysis product ZnO created from the antitack agent reacted with the $Fe_2O_3$ to form the spinel $Fe_2ZnO_4$.

EXAMPLE 6

A mixture containing iron powder, and nickel stearate and iron stearate as antitack agent, was pressed to form a molded article, the proportion of the antitack agent with respect to the weight of the iron powder amounting to approximately 1.5% by weight, and the atomic ratio Ni:Fe being approximately 1:2. The molded article was treated further, as described in Example 1. The pyrolysis products NiO and $Fe_2O_3$ reacted with each other to form the spinel $Fe_2NiO_4$ (franklinite).

What is claimed is:

1. A powdered metal composite material, comprising:

at least two oxides encapsulating powdered metal particles, the at least two oxides forming at least one common phase;

wherein the composite material includes a soft magnetic material.

2. The composite material according to claim 1, wherein:

the powdered metal particles include iron materials.

3. The composite material according to claim 2, wherein:

the powdered metal particles include iron.

4. The composite material according to claim 1, wherein:

the at least one common phase includes one of a glass and one of a mixed oxide having a spinel structure, metal phosphates, and metal silicates.

5. A powdered composite material comprising:

at least two oxides encapsulating powdered metal particles, the at least two oxides forming at least one common phase;

wherein the at least one common phase includes one of a glass and one of a mixed oxide having a spinel structure, metal phosphates, and metal silicates; and wherein the mixed oxide includes at least one of $Al_2MgO_4$ (spinel), $Al_2ZnO_4$ (zinc spinel), $Al_2MnO_4$ (manganese spinel), $Al_2FeO_4$ (iron spinel), $Fe_2MgO_4$ (magnoferrite), $Fe_3O_4$ (magnetite), $Fe_2ZnO_4$ (franklinite), $Fe_2MnO_4$ (jakobsite), $Fe_2NiO_4$ (trevirite), $Cr_2FeO_4$ (chromite) and $Cr_2MgO_4$ (magnochromite).

6. The composite material according to claim 4, wherein:

the metal phosphates include zinc phosphate and iron phosphate.

7. A powdered composite material, comprising:

at least two oxides encapsulating powdered metal particles, the at least two oxides forming at least one common phase;

wherein the at least one common phase includes one of a glass and one of a mixed oxide having a spinel structure, metal phosphates, and metal silicates; and wherein the metal silicates include $CoSiO_3$.

8. A starting material, comprising:

a powdered metal for production of a powdered metal composite material; and one of at least two first antitack agents having an oxidic pyrolysis residue and at least one second antitack agent having the oxidic pyrolysis residue and an oxidic fine powder.

9. The starting material according to claim 8, wherein:

the at least two first antitack agents and the at least one second antitack agent include at least one of at least one metal soap and at least one of monoesters of phosphoric acid, diesters of phosphoric acid, triesters of phosphoric acid, boric acid, and silicic acid including at least one of long-chain alcohols and polydimethyldisiloxane having modified reactive groups.

10. The starting material according to claim 9, wherein:

the at least one metal soap includes a stearate.

11. The starting material according to claim 9, wherein:

a metal ion in the at least one metal soap includes one of Ca ions, Mg ions, Al ions, Zn ions, Co ions, Fe ions, Ni ions, Cu ions, Mo ions and Mn ions.

12. The starting material according to claim 8, wherein:

the oxidic fine powder includes at least one of at least one metal oxide and silicic acid.

13. The starting material according to claim 12, wherein:

the at least one metal oxide includes one of $Fe_2O_3$, NiO, ZnO, CoO, MnO, MgO, $Cr_2O_3$, CuO, $MoO_2$.

14. The starting material according to claim 8, wherein:

a particle diameter corresponding to an initial grain size of the oxidic fine powder is less than approximately 1 $\mu$m.

15. The starting material according to claim 14, wherein:

the particle diameter is one of less than and equal to approximately 100 nm.

16. The starting material according to claim 8, wherein:

one of a proportion of the at least two first antitack agents and the at least one second antitack agent lies between approximately 0.1 and 2% by weight, with respect to a weight of the powdered metal, and a sum of proportions of the at least two first antitack agents, the at least one second antitack agent, and the oxidic fine powder lies between approximately 0.2 and 3% by weight, with respect to the weight of the powdered metal.

17. The starting material according to claim 16, wherein:

the sum of the proportions of the at least two first antitack agents, the at least one second antitack agent, and the oxidic fine powder is one of less than and equal to approximately 2% by weight.

18. The starting material according to claim 16, wherein:

one of the proportion of the at least two first antitack agents and the at least one second antitack agent and a sum of the proportions of the at least two first antitack agents, the at least one second antitack agent, and the oxidic fine powder lies between approximately 0.5 and 1.5% by weight.

19. A method for producing a composite material, the method comprising:

pressing a starting material to form a molded article;

pyrolyzing antitack agents to oxides by performing a heating in a nonreducing atmosphere; and causing the oxides to react with one another to form at least one common phase.

20. The method according to claim 19, wherein:

one of a chemical compound and a glass is produced as the at least one common phase.

21. The method according to claim 20, wherein:

a proportion of added amounts of one of the antitack agents and a combination of the antitack agents and a fine powder is approximately stoichiometric with respect to at least one specific compound to be formed in response to the reaction of the oxides.

22. The method according to claim 19, further comprising:

heating the molded article to a temperature distinctly below a sintering temperature of a powdered metal.

23. The method according to claim 22, wherein:

the powdered metal contains iron materials and is heated to a temperature distinctly less than 1150° C.

24. The method according to claim 23, wherein:

the heating of the molded article is performed to a temperature less than approximately 800° C.

25. The method according to claim 24, wherein:

the heating of the molded article is performed to a temperature between approximately 150° and 550° C.

26. The method according to claim 19, wherein:

the heating of the molded article is performed in a nonreducing atmosphere.

27. The method according to claim 26, wherein:

the heating of the molded article is performed in one of a nitrogen-containing atmosphere and an argon-containing atmosphere.

28. The composite material according to claim 4, wherein:

the glass includes one of a silicate and a boron-containing glass.

29. The starting material according to claim 8, wherein:

the powdered metal composite includes at least two oxides encapsulating powdered metal particles, the at least two oxides forming at least one common phase.

30. The method according to claim 19, wherein:

the composite material includes at least two oxides encapsulating powdered metal particles, the at least two oxides forming at least one common phase, and the starting material includes one of at least two antitack agents having an oxidic pyrolysis residue and at least one antitack agent having the oxidic pyrolysis residue and an oxidic fine powder.

* * * * *